US011563911B2

(12) United States Patent
Li et al.

(10) Patent No.: US 11,563,911 B2
(45) Date of Patent: Jan. 24, 2023

(54) METHOD AND SYSTEM FOR TIME-OF-FLIGHT IMAGING WITH HIGH LATERAL RESOLUTION

(71) Applicant: Northwestern University, Evanston, IL (US)

(72) Inventors: Fengqiang Li, Evanston, IL (US); Oliver Strider Cossairt, Evanston, IL (US)

(73) Assignee: Northwestern University, Evanston, IL (US)

( * ) Notice: Subject to any disclaimer, the term of this patent is extended or adjusted under 35 U.S.C. 154(b) by 241 days.

(21) Appl. No.: 16/597,570

(22) Filed: Oct. 9, 2019

(65) Prior Publication Data

US 2020/0120299 A1  Apr. 16, 2020

Related U.S. Application Data

(60) Provisional application No. 62/743,651, filed on Oct. 10, 2018.

(51) Int. Cl.
| | |
|---|---|
| *H04N 5/369* | (2011.01) |
| *H04N 5/232* | (2006.01) |
| *H04N 5/347* | (2011.01) |
| *G02B 26/08* | (2006.01) |
| *G01S 7/4865* | (2020.01) |
| *G06V 10/147* | (2022.01) |

(52) U.S. Cl.
CPC ....... *H04N 5/36965* (2018.08); *G01S 7/4865* (2013.01); *G02B 26/0841* (2013.01); *G06V 10/147* (2022.01); *H04N 5/232121* (2018.08); *H04N 5/347* (2013.01)

(58) Field of Classification Search
CPC .......................... H04N 5/3696; H04N 5/36965
See application file for complete search history.

(56) References Cited

U.S. PATENT DOCUMENTS

| | | | | |
|---|---|---|---|---|
| 2012/0038817 | A1* | 2/2012 | McMackin | H04N 5/2351 348/E5.045 |
| 2013/0088726 | A1* | 4/2013 | Goyal | G01S 17/10 356/634 |
| 2014/0028705 | A1* | 1/2014 | Furui | H04N 9/31 345/619 |

(Continued)

OTHER PUBLICATIONS

Sun, et al. "Single-pixel three-dimensional imaging with time-based depth resolution", Nature Communications, Jul. 5, 2016 (Year: 2016).*

(Continued)

*Primary Examiner* — Twyler L Haskins
*Assistant Examiner* — Dwight Alex C Tejano
(74) *Attorney, Agent, or Firm* — Bell & Manning, LLC

(57) ABSTRACT

An image capturing system includes a light source configured to emit light toward an object or scene that is to be imaged. The system also includes a time-of-flight image sensor configured to receive light signals based on reflected light from the object or scene. The system also includes a processor operatively coupled to the light source and the time-of-flight image sensor. The processor is configured to perform compressive sensing of the received light signals. The processor is also configured to generate an image of the object or scene based at least in part on the compressive sensing of the received light signals.

14 Claims, 16 Drawing Sheets

(56) References Cited

U.S. PATENT DOCUMENTS

| | | | | |
|---|---|---|---|---|
| 2015/0156477 | A1* | 6/2015 | Lee | H04N 13/254 348/46 |
| 2015/0219500 | A1* | 8/2015 | Maes | G01J 5/0896 353/33 |
| 2017/0163971 | A1* | 6/2017 | Wang | G01S 17/10 |
| 2017/0276545 | A1* | 9/2017 | Henriksson | G06T 9/00 |
| 2018/0331139 | A1* | 11/2018 | Genov | G06T 3/4015 |
| 2019/0227169 | A1* | 7/2019 | Wong | G01S 17/894 |
| 2019/0353887 | A1* | 11/2019 | Riza | H04N 5/2355 |

OTHER PUBLICATIONS

J. Levinson et al., "Towards fully autonomous driving: Systems and algorithms," IEEE Intelligent Vehicles Symposium, Baden-Baden, Germany, Jun. 5-9, 2011, pp. 163-168.
Wekel et al., "Vision based obstacle detection for wheeled robots," International Conference on Control, Automation and Systems, pp. 1587-1592 (2008).
G. A. Howland et al., "Photon counting compressive depth mapping," Optics Express, vol. 21, No. 20, pp. 23822-23837 Oct. 7, 2013.
L. R. Bissonnette, "Lidar: Range-Resolved Optical Remote Sensing of the Atmosphere," Springer 102, (2005), pp. 1-467.
C. D. Mutto et al., "Time-of-flight cameras and Microsoft Kinect™" Springer, Jan. 24, 2013, pp. 1-116.
S. Foix et al., "Lock-in time-of-flight (ToF) Cameras: A Survey," IEEE Sens. J., vol. 11, No. 9, Sep. 2011, pp. 1917-1926.
R. Lange et al., "Solid-State time-of-flight range camera," IEEE Journal of Quantum Electronics, vol. 37, No. 3, Mar. 2001, pp. 390-397.
TI ToF sensor, https://www.ti.com/sensing-products/optical-sensors/3d-time-of-flight/overview.html, (2016).
R. Hartley et al., *Multiple view geometry in computer vision*, Cambridge University, 2003, pp. 1-48.
C. Yeh et al., "A Streamlined Photometric Stereo Framework for Cultural Heritage," in Proc. ECCV (Springer), pp. 738-752 (2016).
F. Heide et al., "Low-budget transient imaging using photonic mixer devices," ACM Trans. Graph. 32(4), 45 (2013).
A. Kadambi et al., "Coded time of flignt cameras: sparse deconvolution to address multipath interference and recovertime profiles," ACM Trans. Graph. 32(6), pp. 167-1-167-10, (2013).
F. Heide et al., "Doppler time-of-flight imaging," ACM Trans. Graph. 34(4), 36 (2015).
F. Heide et al., "Imaging in scattering media using correlation image sensors and sparse convolutional coding," 22(2), 26338-26350 (2014).
K. Yasutomi et al., "A time-of-flight image sensor with sub-mm resolution using draining only modulation pixels," Proc. Int. Image Sensor Workshop, 357-360 (2013).
S. Kim et al., "Time of flight image sensor with 7μm Pixel and 640×480 resolution," IEEE Symposium on VLSI Technology, T146-T147 (2013).
S. Schuon et al., "High-quality scanning using time-of-flight depth superresolution," in Proc. CVPR Workshops (IEEE), 1-7 (2008).
R. Nair et al., "A survey on time-of-flight stereo fusion," Springer, 105-127 (2013).
G. D. Evangelidis et al., "Fusion of range and stereo data for high-resolution scene-modeling," IEEE Trans. Pattern Anal. Mach. Intell. 37(11), 2178-2192 (2015).
C. Ti et al. "Simultaneous Time-of-Flight Sensing and Photometric Stereo with a Single ToF Sensor," in Proc. CVPR (IEEE), 4334-4342 (2015).
A. Kadambi et al., "Polarized 3d: High-quality depth sensing with polarization cues," in Proc. CVPR (IEEE), 3370-3378 (2015).
L. Xiao et al., "Defocus deblurring and superresolution for time-of-flight depth cameras," in Proc. CVPR (IEEE), 2376-2384 (2015).
J. Xie et al., "Single depth image super resolution and denoising via coupled dictionary learning with local constraints and shock filtering," in Proc. ICME (IEEE), 1-6 (2014).
J. Xie et al., "Edge-guided single depth image super resolution," IEEE Trans. Image Process. 25(1), 428-438 (2016).
X. Song et al., Computer Vision ACCV 2016—Part IV—"Deep Depth Super-Resolution: Learning Depth Super-Resolution using Deep Convolutional Neural Network," pp. 360-376.
D. W. Davies, "Spatially multiplexed infrared camera," Journal of the Optical Society of America 65(6), 707-711 (1975).
R. N. Ibbett et al., "Real-time multiplexing or dispersed spectra in any wavelength region," Applied Optics 7(6), 1089-1094 (1968).
N. J. A. Sloane et al., "Codes for multiplex spectrometry," Applied Optics 8(10), 2103-2106 (1969).
J. A. Decker et al., "Experimental operation of a Hadamard spectrometer," Applied Optics 8, 2552 (1969).
E. D. Nelson et al., "Hadamard spectroscopy," Journal of the Optical Society of America 60(12), 1664-1669 (1970).
Y. Y. Schechner et al., "Multiplexing for optimal lighting," IEEE Trans. Pattern Anal. Mach. Intell. 29(8), 1339-1354 (2007).
M. F. Duarte et al., "Single-pixel imaging via compressive sampling," IEEE Signal Process. Mag. 25(2), 83-91 (2008).
G. A. Howland et al., "Photon-counting compressive sensing laser radar for 3D imaging," Applied Optics 50(31), 5917-5920 (2011).
A. Kirmani et al., "Exploiting sparsity in time-of-flight range acquisition using a single time-resolved sensor," Optics Express 19(22), 21485-21507 (2011).
A. C. Sankaranarayanan et al., "Compressive acquisition of dynamic scenes," in Proc. ECCV (Springer), (2010), pp. 129-142.
A. C. Sankaranarayanan et al., "CS-MUVI: Video compressive sensing for spatial-multiplexing cameras," in Proc. ICCP (IEEE), pp. 1-11, (2012).
J. Wang et al., "LiSens: A scalable architecture for video compressive sensing," in Proc. ICCP (IEEE), pp. 1-9, (2015).
H. Chen et al., "FPA-CS: Focal plane array-based compressive imaging in short-wave infrared," in Proc. CVPR (IEEE), 2358-2366 (2015).
M. Gupta et al., "Phasor imaging: A generalization of correlation-based time-of-flight imaging," ACM Trans. Graph. 34(5), 156 (2015).
M. O'Toole et al., Temporal frequency probing for 5D transient analysis of global light transport, ACM Trans. Graph. 33(4), 87 (2014).
J. M. Bioucas-Dias et al., "A new TwIST: Two-step iterative shrinkage/thresholding algorithms for image restoration," IEEE Trans. Image Process. 16(12), 2992-3004 (2007).
Y. Endo et al., GPU-accelerated compressive holography, Optics Express 24(8), 8437-8445 (2016).
S. Yu et al., "Compressed sensing of complex-valued data," Signal Processing 92(2), 357-362 (2012).
D. Mittleman, "Sensing with terahertz radiation," Springer 85, (2013).
J. H. Ender, "On compressive sensing applied to radar," Signal Processing 90(5), 1402-1414 (2010).
D. Scharstein et al., "High-accuracy stereo depth maps using structured light," in Proc. CVPR (IEEE), pp. 1-8, (2003).

* cited by examiner

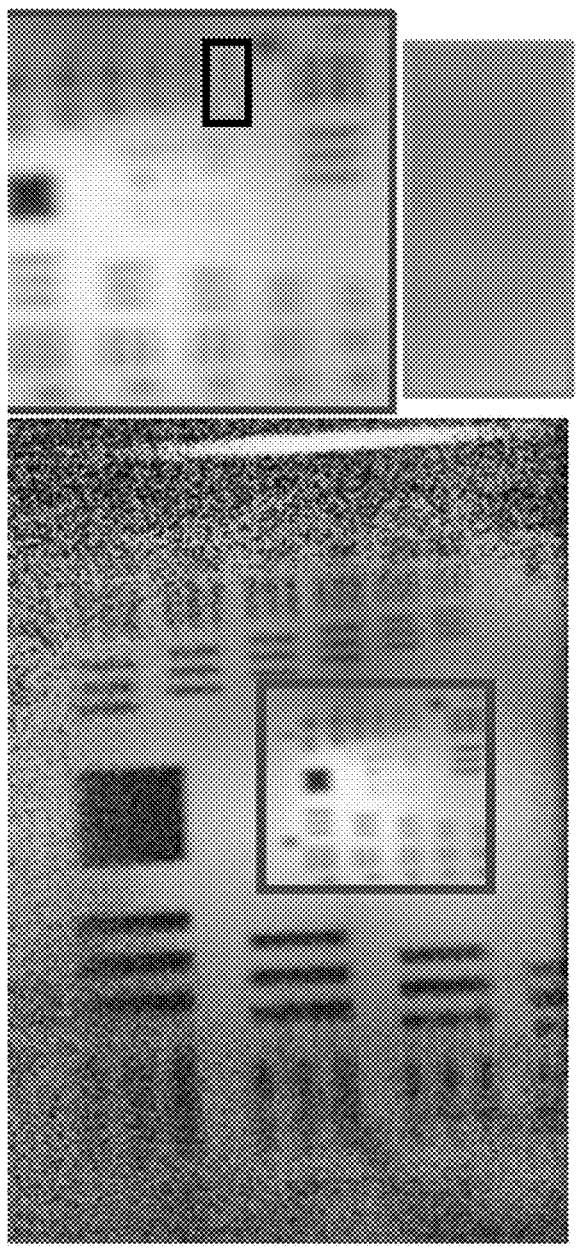 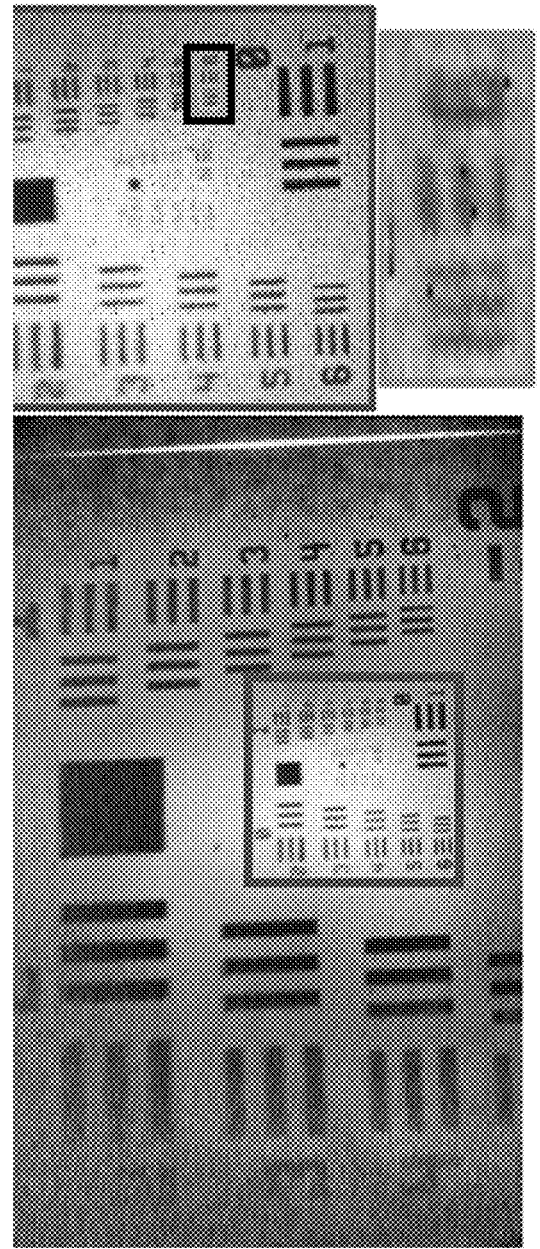
Fig. 4A
Fig. 4B

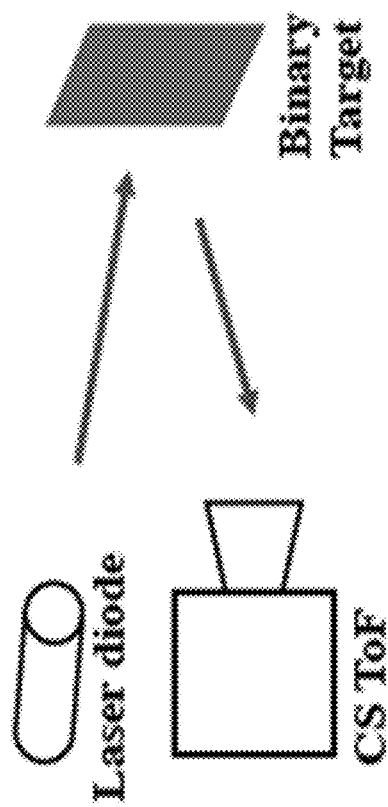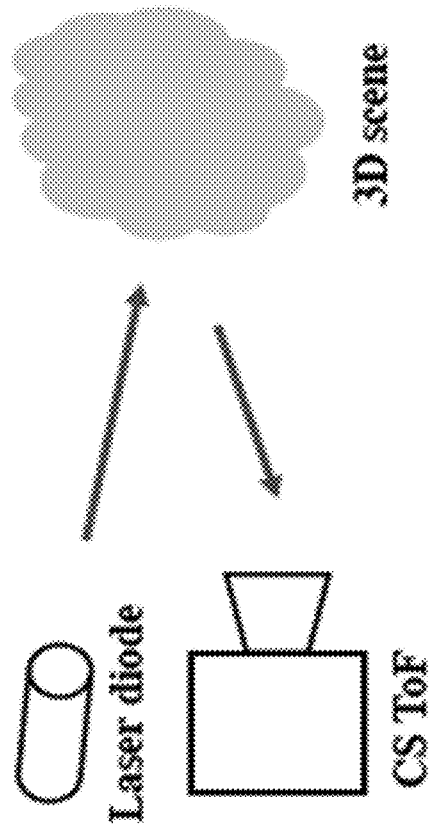
Fig. 5A
Fig. 5B

|  | RMSE with 30dB SNR (mm) | RMSE with 25dB SNR (mm) | RMSE with 20dB SNR (mm) |
| --- | --- | --- | --- |
| Bicubic Interpolation of LR ToF | 24.2 | 25.2 | 28.3 |
| HR CS-TOF reconstruction (0.6)[1] | 19.3 | 19.3 | 19.7 |
| HR CS-TOF reconstruction (0.2)[2] | 19.0 | 19.3 | 19.5 |

Fig. 9

METHOD AND SYSTEM FOR TIME-OF-FLIGHT IMAGING WITH HIGH LATERAL RESOLUTION

CROSS-REFERENCE TO RELATED APPLICATION

The present application claims the priority benefit of U.S. Provisional Patent App. No. 62/743,651 filed on Oct. 10, 2018, the entire disclosure of which is incorporated herein by reference.

REFERENCE TO GOVERNMENT RIGHTS

This invention was made with government support under Grant No. IIS-1453192 awarded by the National Science Foundation (NSF), under Grant No. HR0011-16-C-0028 awarded by The Defense Advanced Research Projects Agency (DARPA), and under Grant No. N00014-15-1-2735 awarded by the Office of Naval Research (ONR). The government has certain rights in the invention.

BACKGROUND

A time-of-flight (ToF) camera system is a range imaging camera system that resolves distance based on the speed of light. Specifically, a ToF camera system measures the time-of-flight of a light signal between the camera and the subject for each point of the image being captured. Existing ToF camera systems cover ranges of a few centimeters up to several kilometers, and have a distance resolution of approximately 1 centimeter (cm). Time-of-flight camera systems are able to operate rapidly, providing up to 160 images per second. Traditional ToF camera systems typically include an illumination source to illuminate a scene being imaged, optics components that gather reflected light and image the environment being captured, an image sensor to determine the amount of time for light to travel from the illumination source, to an object being captured, and back again, driver electronics to synchronize the system, and a user interface.

SUMMARY

An illustrative image capturing system includes a light source configured to emit light toward an object or scene that is to be imaged. The system also includes a time-of-flight image sensor configured to receive light signals based on reflected light from the object or scene. The system also includes a processor operatively coupled to the light source and the time-of-flight image sensor. The processor is configured to perform compressive sensing of the received light signals. The processor is also configured to generate an image of the object or scene based at least in part on the compressive sensing of the received light signals.

An illustrative method of capturing images with a time-of-flight camera system includes capturing, by a time-of-flight image sensor, light signals based on reflected light from an object or scene. The method also includes performing, by a processor operatively coupled to the time-of-flight image sensor, spatial multiplexing and compressive sensing on the captured light signals. The method also includes generating, by the processor, an image of the object or scene based at least in part on the spatial multiplexing and the compressive sensing.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 4A shows original low-resolution ToF measurement of the resolution chart target in accordance with an illustrative embodiment.

FIG. 4B shows the pixel-wise scanning for the resolution target in accordance with an illustrative embodiment.

FIG. 5A is a conceptual diagram of the resolution target experiment in accordance with an illustrative embodiment.

FIG. 5B is a conceptual diagram of the 3D natural scene experiment in accordance with an illustrative embodiment.

FIG. 9 is a table depicting RMSE of LR ToF measurement depth with bicubic interpolation and HR CS-ToF reconstruction depth with respect to the ground truth depth in accordance with an illustrative embodiment.

DETAILED DESCRIPTION

Figure 1:
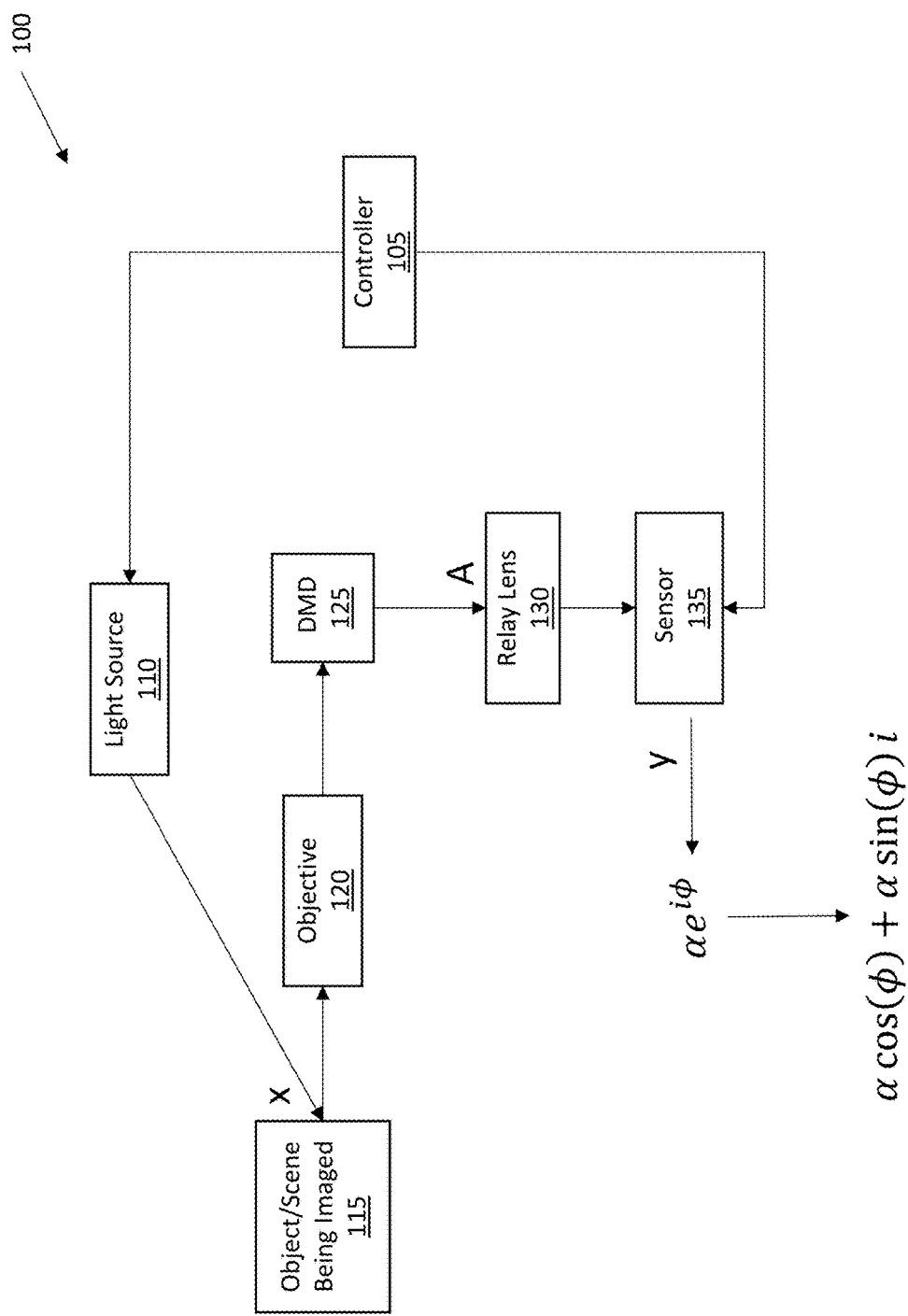
FIG. 1 depicts a system architecture of a compressive sensing time-of-flight (CS-ToF) system in accordance with an illustrative embodiment.

Three-dimensional imaging using Time-of-flight (ToF) sensors is rapidly gaining widespread adoption in many applications due to its cost effectiveness, simplicity, and compact system size. However, the current generation of ToF cameras suffers from low spatial resolution due to physical fabrication limitations. Described herein is a Compressive Sensing-Time-of-Flight (CS-ToF) system, which is an imaging architecture to achieve high spatial resolution ToF imaging via optical multiplexing and compressive sensing. The techniques and systems described herein are based in part on the observation that, while depth is non-linearly related to ToF pixel measurements, a phasor representation of captured images results in a linear image formation model. This property is utilized to develop a CS-based technique that is used to recover high resolution three-dimensional (3D) images. Based on the proposed architecture, a prototype 1-megapixel compressive ToF camera was developed that achieves as much as 4 times improvement in spatial resolution and 3 times improvement for natural scenes. It is believed that the proposed CS-ToF architecture provides a simple and low-cost solution to improve the spatial resolution of ToF and related sensors.

Three-dimensional sensors are being adopted in a number of commercial applications including self-driving cars and robotics. The focus of the present disclosure is on 3D Time-of-Flight (ToF) based sensors that can be used for any application. ToF cameras can be broadly classified into two categories based on the illumination signal: pulsed/light detection and ranging (LIDAR) cameras and continuous wave amplitude modulated (CWAM) ToF cameras, also referred as lock-in ToF cameras. The proposed embodiments are directed to CWAM-ToF cameras and the abbreviation 'ToF' is used to describe them throughout. ToF cameras are a practical and promising approach for inexpensive active 3D sensing with range independent depth resolution (as compared to stereo or multi-view triangulation) and compact form factor (as compared to LIDAR devices). In the last decade, other imaging applications using ToF cameras have also been developed such as transient captures of light with ToF camera systems based on photonic mixer devices. Additionally, a doppler time-of-flight system exists that can compute the 3D velocity of objects instead of their depth. A fundamental limit of performance in all these applications is the low spatial resolution that is achieved.

A ToF imager is a focal plane array that simultaneously encodes the intensity and depth information at each pixel for a given scene. ToF cameras typically include an amplitude modulated light source, such as a laser or light-emitting diode (LED), that actively illuminates the scene and is coupled with a correlation sensor at each pixel that is locked-in to the same frequency. Multiple measurements are obtained with different amount of phase shift between transmitted and detected light. The amplitude modulation in most ToF cameras is performed at a modulation frequency in the 10-100 megaHertz (MHz) range and this frequency controls both the unambiguous range of depths and the depth resolution of the ToF sensor. Additional electronics are used to implement the correlation measurement individually at each pixel, utilizing a significantly larger number of transistors per-pixel. Thus, while the pixel size of traditional CMOS image sensors have approached close to 1 micron with a fill factor greater than 90%, current generation ToF sensors can only achieve pixel sizes closer to 10 microns with fill factors closer to 10%.

As a consequence of the aforementioned pixel size and fill factor, ToF sensors with a given footprint (which is typically constrained by die size in the semiconductor fabrication process) will have a significantly lower resolution than their RGB imaging counterparts. Increasing the overall sensor size (or die size) is generally cost prohibitive as manufacturing cost grows exponentially with the size of the wafer. Therefore, improving ToF spatial resolution without increasing sensor size is an area of significant potential interest.

Previously, hybrid ToF systems that combine ToF with other imaging modalities like stereo, photometric stereo, and polarization, have been used to achieve super-resolution (SR) performance with commercial ToF cameras. However, these hybrid ToF systems involve advanced fusion algorithms and careful registrations between the ToF camera and the other imaging modality. Some systems use deblurring techniques for super resolution using purely software-based techniques. Super-resolution (SR) algorithms were also used to captured ToF images to improve both lateral and depth resolution. Learning-based approaches such as dictionary learning and deep learning have also been used to improve resolution. However, there is a critical difference between the proposed CS-ToF and conventional SR algorithms. Software-based techniques cannot arbitrarily increase resolution. In contrast, the proposed CS-ToF system performs time-multiplexed optical coding whereby each additional acquired image introduces new spatial information. If temporal resolution is sacrificed, CS-ToF can achieve the full spatial resolution of a digital micro-mirror device (DMD). Resolutions as high as 2 megapixels (MP) can be achieved using currently available off-the-shelf commercial products.

One consideration is whether optical multiplexing and compressive sensing (CS) can improve current ToF systems. Optical multiplexing leverages spatial light modulators (SLMs) to achieve high-resolution imaging with a limited number of sensing elements. Digital micro-mirror devices (DMDs) and liquid crystal on silicon (LCoS) are examples of relatively low cost, commercially available SLMs with at least 1-megapixel resolution. Applications of optical multiplexing include infra-red imaging, spectroscopy, and light transport. By combining compressive sensing and optical multiplexing, a system can greatly reduce the number of measurements needed. One example of this is a single pixel camera, in which only a single photodiode is used to recover images of 256×256 pixels. A single photodiode with compressive sensing can also be used for depth estimation of the imaged scene. Described herein is use of a focal array ToF sensor to increase the measurement bandwidth compared to previous methods using single photodiodes. In one embodiment, a spatial light modulator (SLM) is used to multiplex spatial information into just a few measurements and utilize transform-domain sparsity to reconstruct images at higher resolution than the sensor can natively support.

As discussed below, the idea of multiplexed/compressive sensing of spatial information is expanded to both intensity and depth images. While the transform-domain sparsity of natural images applies equally well to depth images, the depth is non-linearly related to the intensity measured at each pixel on a ToF sensor. While this property can significantly complicate the reconstruction process, the complication can be avoided by adopting a slightly modified signal representation. For example, a phasor representation can be used to model ToF sensors. In the phasor representation, the multiplexing of multiple scene points onto a single sensor measurement can be written as a linear mixing model, thereby allowing one to naturally extend CS-based reconstruction techniques to ToF sensors (CS-ToF).

The proposed CS-ToF systems are novel imaging architectures that improve the spatial resolution of ToF sensors by performing spatial multiplexing and compressive sensing. A phasor representation is used to model the phase and amplitude component of captured correlation signals, resulting in a linear forward model. During CS-based reconstruction, the amplitude of the reconstructed phasor is regularized using a transform-domain sparsity prior. This results in a significant reduction in the number of measurements involved for recovery of depth and intensity images with high resolution. The proposed ToF imaging architecture is described below, along with reconstruction algorithms, and demonstration of a working prototype capable of high-resolution compressive ToF imaging using the proposed framework.

FIG. 1 depicts a system architecture of a CS-ToF system 100 in accordance with an illustrative embodiment. The system 100 includes a controller 105, a light source 110 that emits light toward an object/scene 115 being imaged, an objective 120, a DMD 125, a relay lens 130, and a sensor 135. In alternative embodiments, the system 100 can include fewer, additional, and/or different elements. The controller 105 can include computing components that are used to synchronize and control the system 100. The controller 105 can include a processor, memory, transceiver, user interface, etc.

In one embodiment, the light source 110 can be a near infrared (IR) laser diode is used to illuminate the object/scene 115 being imaged. Alternatively, a different type of light source may be used such as one or more different laser sources, one or more light-emitting diodes (LEDs), etc. The light from the light source 110 hits the object/scene 115, is reflected, and passed through the objective 120 to the DMD 125 such that the object/scene 115 is formed on the DMD 125. The high-resolution DMD-modulated image is relayed to the sensor 135 via the relay lens 130. In some embodiments, the system can also include a total internal reflection (TIR) prism positioned between the DMD 125 and the relay lens 130. In an illustrative embodiment, the sensor 135 is a low-resolution ToF camera. The high-resolution DMD-modulated image is thus re-imaged at the ToF sensor plane of the sensor 135. By using the controller to change the coding on the DMD 125 over the course of multiple exposures, the system 100 is able to perform spatiotemporal multiplexing of the object/scene 115. The system 100 reconstructs high-resolution amplitude and depth images from multiple low-resolution ToF measurements.

Figure 2:
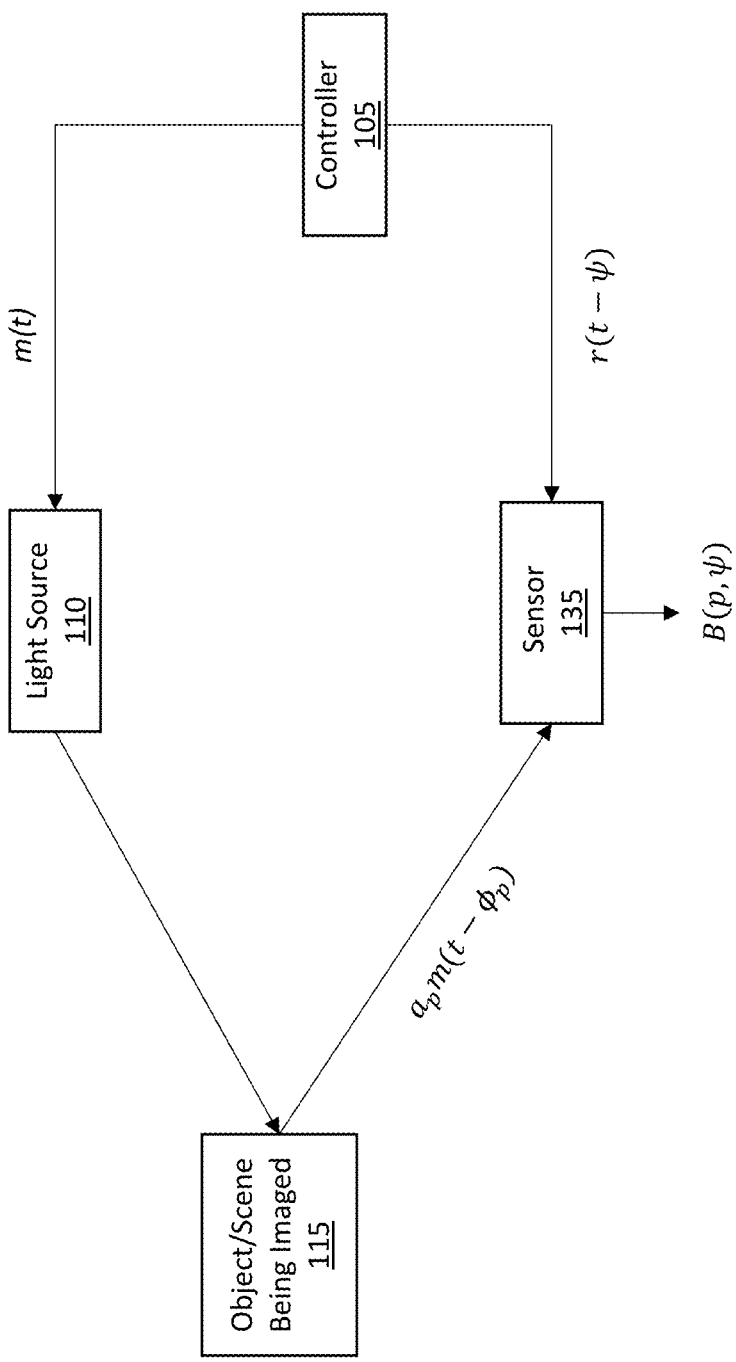
FIG. 2. depicts ToF depth imaging with the system of FIG. 1 in accordance with an illustrative embodiment.

As discussed above, ToF is an active 3D imaging technique with a light source. FIG. 2. depicts ToF depth imaging with the system of FIG. 1 in accordance with an illustrative embodiment. As shown, the controller (or computer) 105 sends out two signals: m(t) to control the light source 110 and r(t−ψ) as a reference to the sensor 135 (or ToF camera). The reflection from the object/scene 115 ($a_p m(t-\phi_p)$) is collected by ToF pixels, and correlates with the reference signal (r(t−ψ)) to generate the output of the sensor 135. Both the light source 110 (e.g., laser diodes) and the shutter of the ToF camera are amplitude-modulated, typically at the same frequency ω. The output of the light source 110 can be denoted m(t) and the coding at the shutter can be r(t−ψ)), where ψ is an arbitrary phase delay that is introduced at the shutter. While the modulated light m(t) travels through space, some part of this light can be reflected by an object at a distance d. Some of this reflected light will reach a sensor pixel p. The light received at the sensor pixel retains the amplitude modulation frequency ω but will be phase delayed $$\left(\phi_p = \frac{\omega d_p}{2c},\right.$$

$d_p$ is the distance of the object) and attenuated ($a_p m(t-\phi_p)$). The sensor measurement at the pixel p, for an exposure duration T can be written as:

$$B(p,\psi)=\int_{t=0}^{T} a_p m(t-\phi_p) r(t-\psi) dt \qquad \text{Eq. 1:}$$

In most commercial ToF cameras, including the ones described herein, the illumination and the reflected signals are of the form:

$$m(t)=o_m+a_m \cos(\omega t) \qquad \text{Eq. 2:}$$

$$r(t)=o_r+a_r \cos(\omega t-\psi), \qquad \text{Eq. 3:}$$

where $o_m$, $a_m$, $o_r$, and $a_r$ are constants. By varying the delay ψ on r(t), one can capture the entire correlation between the reflected signal and the exposure signal. Using demodulation techniques, the reflected signal can be completely recovered. However, most conventional ToF sensors use only four measurements (referred to as quadrature measurements) that correspond to ψ=0,π/2,π,3π/2, to recover the amplitude $a_p$ and the phase $\phi_p$ of the reflected signal, as given by the following equations:

$$a(p) = \sqrt{\frac{[B(p, 3\pi/2) - B(p, \pi/2)]^2 + [B(p, \pi) - B(p, 0)]^2}{2}} \qquad \text{Eq. 4}$$

$$\phi(p) = \arctan\left(\frac{B(p, 3\pi/2) - B(p, \pi/2)}{B(p, \pi) - B(p, 0)}\right). \qquad \text{Eq. 5}$$

It is apparent from Equations 4 and 5 that the phase and amplitude are non-linearly related to the correlational measurements. A linear model relating the scene to the ToF camera measurement can be used to recover a high resolution estimate of the scene via compressive sensing. For example, there may be two ToF pixels $p_1$ and $p_2$ with corresponding amplitude and phase of ($a_{p_1}$, $\phi_{p_1}$) and ($a_{p_2}$, $\phi_{p_2}$). If $p_1$ and $p_2$ are combined to form a super-pixel p, the resulting amplitude and the phase at the super-pixel is not ($a_{p_1}+a_{p_2}$, $\phi_{p_1}+\phi_{p_2}$). Rather, described herein is the use of a phasor representation for the ToF output as a complex signal $ae^{j\phi}$ to build a linear model for the ToF camera system. For consistency, the projection of a scene/object (x) onto the DMD is represented as a complex value encoding its intensity $a_s$ and phase $\phi_s$. The phasor representation for the projection of the object/scene on the DMD and ToF sensor, respectively, are:

$$x = a_s e^{i\phi_s} \qquad \text{Eq. 6:}$$

$$y = ae^{i\phi} \qquad \text{Eq. 7:}$$

This phasor representation is used to build the linear measurement model of the projection of the scene/object onto the DMD and ToF sensor.

As shown in FIG. 1, the object/scene (x) is first projected onto the DMD plane, and modulated with a coded spatial pattern displayed on the DMD 125. The image on the DMD plane is projected to the ToF camera (sensor 135) via the relay lens 130. The measurement model can be represented as:

$$y = CMx = Ax, \qquad \text{Eq. 8:}$$

where C is the mapping from the DMD pixels to the ToF pixels. The variable M is the modulation pattern displayed on the DMD. The equation A=CM represents the translation matrix from the projection of the object/scene on the DMD to the ToF camera. The measurement model can be explicitly written as:

$$y = Ax \Rightarrow \begin{bmatrix} \alpha'_1 e^{i\phi_{1'}} \\ \vdots \\ \alpha'_M e^{i\phi_{M'}} \end{bmatrix} = \begin{bmatrix} C_{11} & \cdots & C_{1N} \\ \vdots & \ddots & \vdots \\ C_{M1} & \cdots & C_{MN} \end{bmatrix} \begin{bmatrix} M_1 \\ \vdots \\ M_N \end{bmatrix} I \begin{bmatrix} \alpha_1 e^{i\phi_1} \\ \vdots \\ \alpha_N e^{i\phi_N} \end{bmatrix}, \qquad \text{Eq. 9}$$

where M and N are the total number of ToF pixels and DMD pixels respectively.

During the measurement, the system can record y of a given object/scene x by T times by displaying a series of patterns on the DMD. Assuming the object/scene x stays relatively still across the period of T measurements, the system can approximate the measurement process as $$\begin{bmatrix} y_1 \\ y_2 \\ \vdots \\ y_T \end{bmatrix} = \begin{bmatrix} A_1 x \\ A_2 x \\ \vdots \\ A_T x \end{bmatrix} = \begin{bmatrix} A_1 \\ A_2 \\ \vdots \\ A_T \end{bmatrix} x, \qquad \text{Eq. 10}$$

where $A_t = CM_t$, $t \in [1, 2, \ldots T]$. The value $M_t$ is the coded pattern displayed on the DMD at time t.

From the measurements y and the system matrix A, the system is configured to reconstruct the projection of the object/scene on the DMD. Given the fact that natural images have sparse gradients, the reconstruction procedure can be reformulated as the following optimization problem:

$$\hat{x} = \operatorname*{argmin}_{x} \frac{1}{2} \|y - Ax\|^2 + \lambda \Phi(x), \qquad \text{Eq. 11}$$

where $\lambda$ is a regularization parameter and $\Phi(x)$ is the regularizer. In an illustrative embodiment, the system utilizes total variation (TV) as the regularization function defined as:

$$\Phi(x) = TV(x) = \Sigma_i \sqrt{|(G_u(x_i)|^2 + |G_v(x_i)|^2}, \qquad \text{Eq. 12:}$$

where $|G_u(x_i)|^2$ and $|G_v(x_i)|^2$ are the horizontal and vertical gradients of a 2D image x at pixel location i. In one experiment, the system can use a TwIST solver to reconstruct the image, as described in more detail below.

Described below are some key aspects of a prototype implementation of the proposed system. In one embodiment, a Fujinon 12.5 mm C-Mount Lens can be used to image the scene onto a 1140×912-pixel DMD (DLP LightCrafter 4500, Texas Instruments). The DMD-modulated images can be re-imaged using an Edmunds Optics Relay Lens. Additionally, a 320×240-pixel ToF sensor (OPT8241, Texas Instruments) can be placed at the focal plane of the relay lens. During the experiments described herein, imaging areas of 186×200 pixels on the ToF sensor were used. In alternative embodiments, different components and/or types of components may be used.

System calibration was also performed. The purpose of system calibration is to estimate the system matrix A, which depends upon various factors such as the DMD pattern, up-sampling factor, and artifacts, as well as optical aberrations and distortion.

Figure 3:
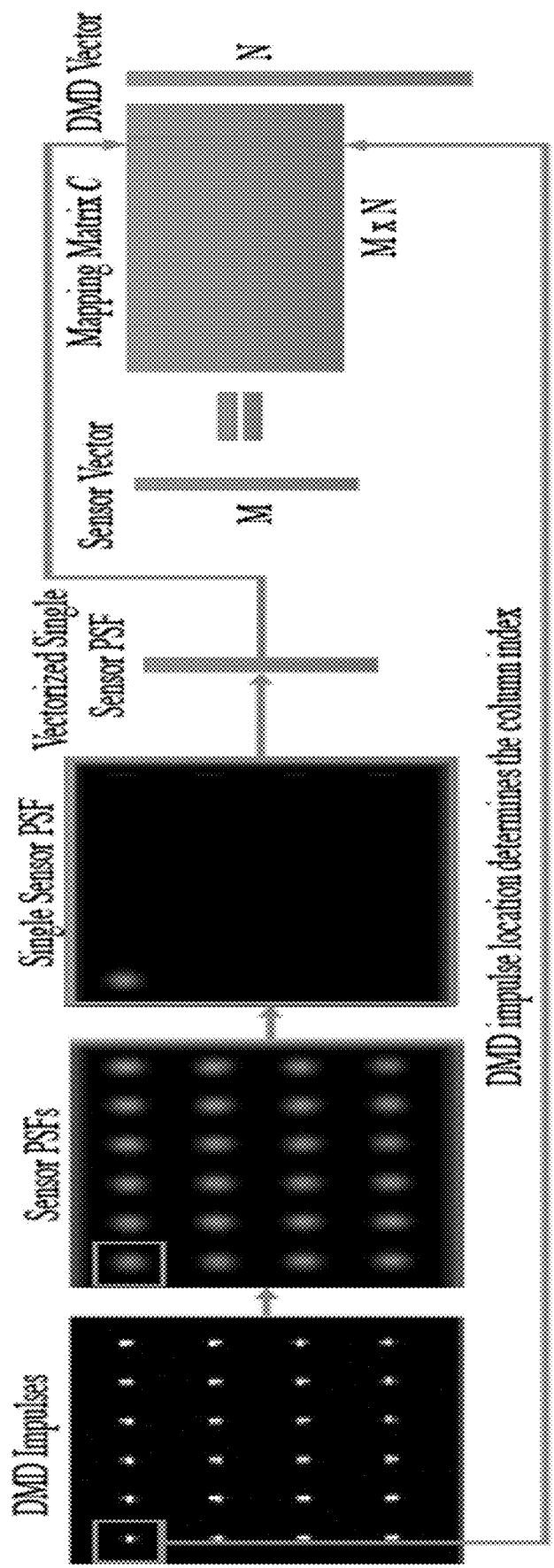
FIG. 3 depicts system calibration in accordance with an illustrative embodiment.

As discussed previously, in the proposed system matrix A=CM, and the DMD mask M is a known pattern displayed on the DMD. Therefore, it is important to determine the matrix C describing the exact mapping from DMD pixels to ToF camera pixels. FIG. 3 depicts system calibration in accordance with an illustrative embodiment. Calibration is performed by displaying an array of impulses on the DMD and measuring the sensor response for each individual impulse in the array. The response is then placed in the corresponding location in C. Every DMD-sensor pixel pair is traversed to complete the matrix C. As shown in FIG. 3, first, an array of pixel impulses is displayed on the DMD, and the point spread function (PSF) is recorded on the ToF camera. The spacing between the DMD impulses is carefully selected to accommodate ToF sensor size and avoid overlapping the PSF on the ToF sensor. As a result, there are 360 impulses per frame. Once the image containing the 360 PSFs is recorded on the ToF, a 5×5 neighborhood around each PSF center is selected, and the system creates 360 images containing only one PSF for each image. Each single-PSF image is vectorized and inserted into its corresponding column in C.

The above procedures are repeated by shifting the impulse array by one pixel, until every DMD pixel is traversed. Eventually, a sparse matrix C is obtained that represents pixel-to-pixel mapping between the DMD and the sensor.

To help ensure measurement quality in the presence of noise, Hadamard patterns can be used as the modulation masks displayed on the DMD. Alternatively, a different type of mask pattern may be used. In one experiment, a 256×256 Hadamard matrix was generated, and each column of the Hadamard matrix was used to form a 16×16 local pattern. Each local pattern was repeated across both the horizontal and vertical directions until it filled the entire DMD plane. This process was repeated to generate all 256 patterns used in the experiments.

For reconstruction, a MATLAB implementation of the TwIST solver was used to reconstruct the images from the multiplexed compressive measurements. The reconstruction tasks were performed on a Desktop Windows PC with Intel i7 CPU and 32 GB RAM running MATLAB with no parallel computing optimization. In alternative embodiments, a different computing system and/or different software may be used. Reconstructing each output image takes about 30-120 seconds, depending on the compression ratios. With more compression (less number of multiplexed measurements), the reconstruction is faster. The wall time to reconstruct the intensity and depth images with a 0.25 compression ratio is about two minutes. The DMD DLP4500 used in the experiments does not have a well-designed application programming interface (API) for modulation pattern transmission and synchronizing with the ToF camera. Therefore, extra time is spent on file input/output, synchronization, and customized controlling codes. The wall time can be reduced by using a customized DMD that interfaces well with both the camera and the computer.

Though one cannot perform real-time video-rate reconstruction currently with TwIST, it is not believed that the solver would be a potential roadblock in the future. There are a variety of complex numerical solvers for linear inverse problem available off-the-shelf. One can also exploit the sparsity in the transform domain of natural images, such as a discrete cosine transform (DCT) or wavelet, and use a L1/Lasso-based regularizer or solver. If real-time reconstruction is a hard constraint, one can use block-wise parallel reconstruction to accelerate the de-multiplexing. Furthermore, there are also suitable solvers with graphical processing unit (GPU) acceleration, as known in the art.

To demonstrate the performance of the proposed setup, three experiments (i.e., resolution chart, Siemens Star, and natural static scene) were performed using the proposed CS-ToF camera system. To understand the maximum spatial resolution of the proposed CS-ToF prototype system, a per-pixel scanning experiment was initially performed on a United States Air Force (USAF) 1951 target. In this experiment, the system did not acquire multiplexed measurements. Instead, each time, a DMD pixel was turned on to record the response on the ToF sensor. This process is repeated to scan through all possible DMD pixels. This brute-force process is similar to the one used for system calibration, except that the flat field is replaced by the USAF target. Once finished, an image at the native resolution of the DMD is formed.

Since the resolution target is flat, a flat phase map is received. FIG. 4 depicts the amplitude pixel-scanning images in accordance with an illustrative embodiment. Specifically, FIG. 4A shows original low-resolution ToF measurement of the resolution chart target in accordance with an illustrative embodiment. FIG. 4B shows the pixel-wise scanning for the resolution target in accordance with an illustrative embodiment. As one can observe, the quality of high-resolution (HR) pixel-scanning results (FIG. 4B) is dramatically improved over the original low-resolution (LR) ToF measurement (FIG. 4A). Details of Group 1 Element 6 (marked with box) are depicted in the insets. As shown, details are well-preserved in the pixel-scanning results, but totally missed in the original LR measurement. The pixel scanning experiment result has demonstrated the CS-ToF ability to increase the spatial resolution of the ToF sensor by about 4 times.

Figure 5C:
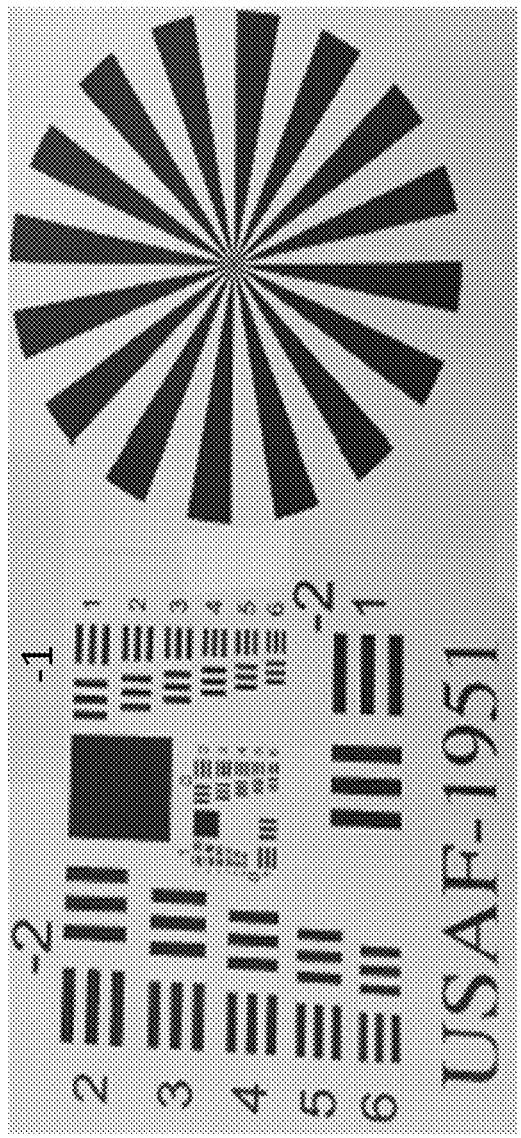
FIG. 5C depicts the binary target in accordance with an illustrative embodiment.
Figure 5D:
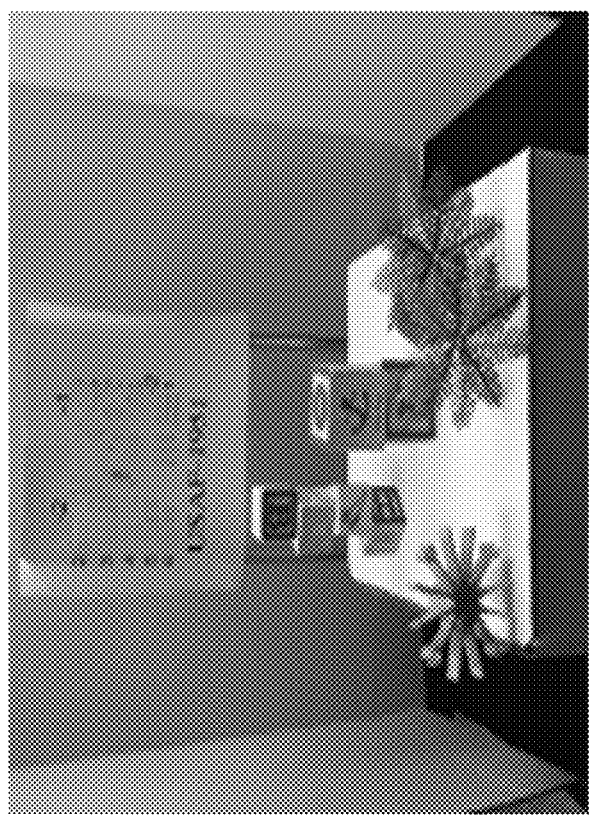
FIG. 5D depicts the natural scene in accordance with an illustrative embodiment.

As discussed above, to evaluate the spatial resolution that the proposed CS-ToF prototype can achieve, experiments were performed on standard resolution targets, including the USAF 1951 Resolution Chart and Siemens Star. The size of the resolution chart and Siemens star are approximately 18×15 $cm^2$ and 15×15 $cm^2$, respectively. The target is approximately 0.5 meters away from camera. The experiment setup is visualized in FIG. 5. FIG. 5A is a conceptual diagram of the resolution target experiment in accordance with an illustrative embodiment. FIG. 5B is a conceptual diagram of the 3D natural scene experiment in accordance with an illustrative embodiment. FIG. 5C depicts the binary target in accordance with an illustrative embodiment. FIG. 5D depicts the natural scene in accordance with an illustrative embodiment. Compressive sensing and reconstruction were performed using 4.5 (no compression), 0.6, and 0.25 compression ratios.

The original low resolution ToF intensity image and HR intensity images recovered by CS-ToF are shown in FIG. 6. FIG. 6A depicts an original low resolution ToF intensity image in accordance with an illustrative embodiment. FIG. 6B depicts a high resolution CS-ToF reconstruction with no compression in accordance with an illustrative embodiment. FIG. 6C depicts a high resolution CS-ToF reconstruction with a 0.6 compression ratio in accordance with an illustrative embodiment. FIG. 6D depicts a high resolution CS-ToF reconstruction with a 0.25 compression ratio in accordance with an illustrative embodiment. Fine patterns on the resolution chart and the center of Siemens Star are shown in the insets of FIG. 6. FIG. 6E depicts ground truth intensity of the insets, taken with a 12-MP camera, in accordance with an illustrative embodiment. Overall, less compression helps improve the reconstruction quality, but 0.25 compression ratio still provides a qualitatively acceptable reconstruction result.

Figure 6A:
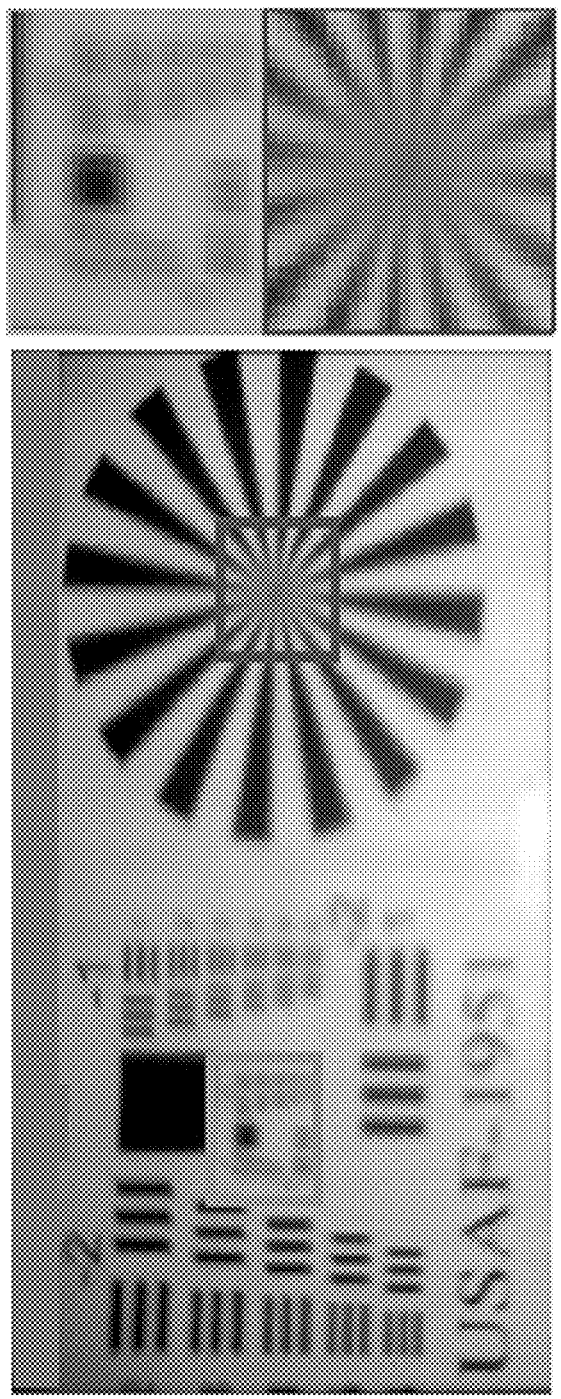
FIG. 6A depicts an original low resolution ToF intensity image in accordance with an illustrative embodiment.
Figure 6B:
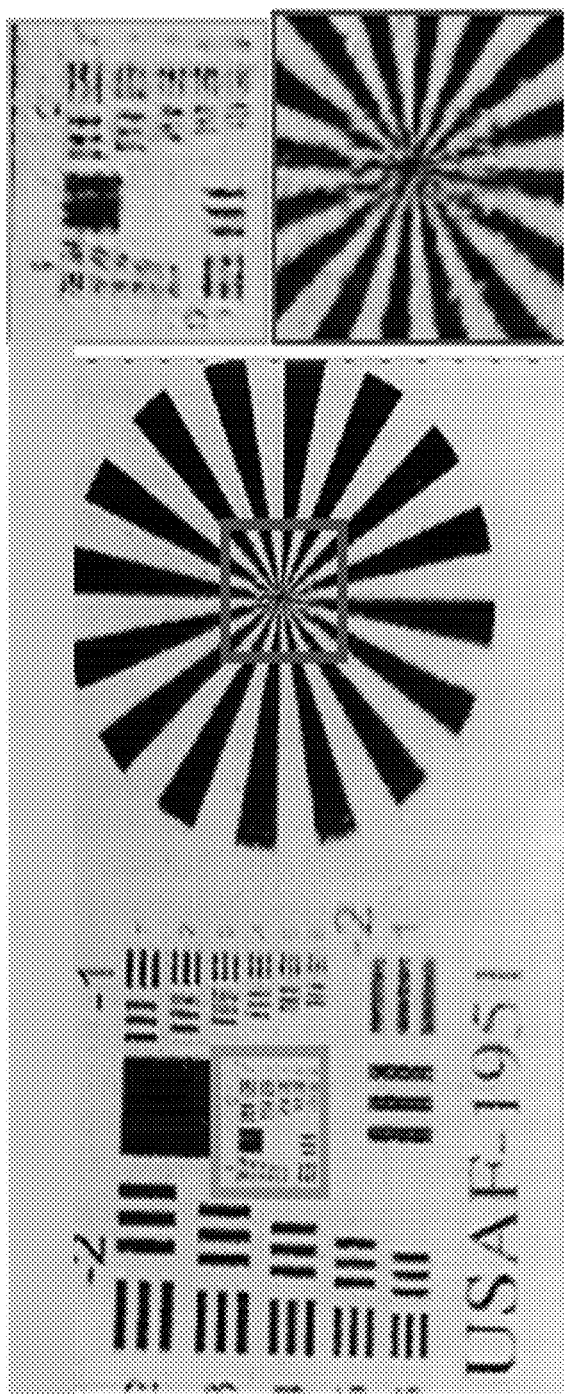
FIG. 6B depicts a high resolution CS-ToF reconstruction with no compression in accordance with an illustrative embodiment.
Figure 6C:
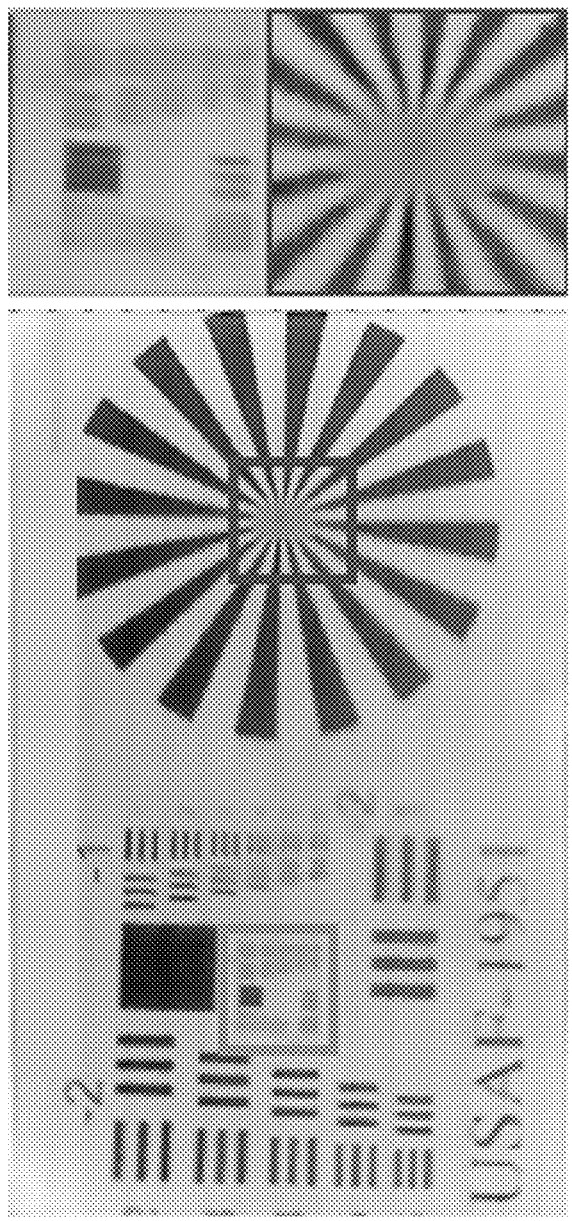
FIG. 6C depicts a high resolution CS-ToF reconstruction with a 0.6 compression ratio in accordance with an illustrative embodiment.
Figure 6D:
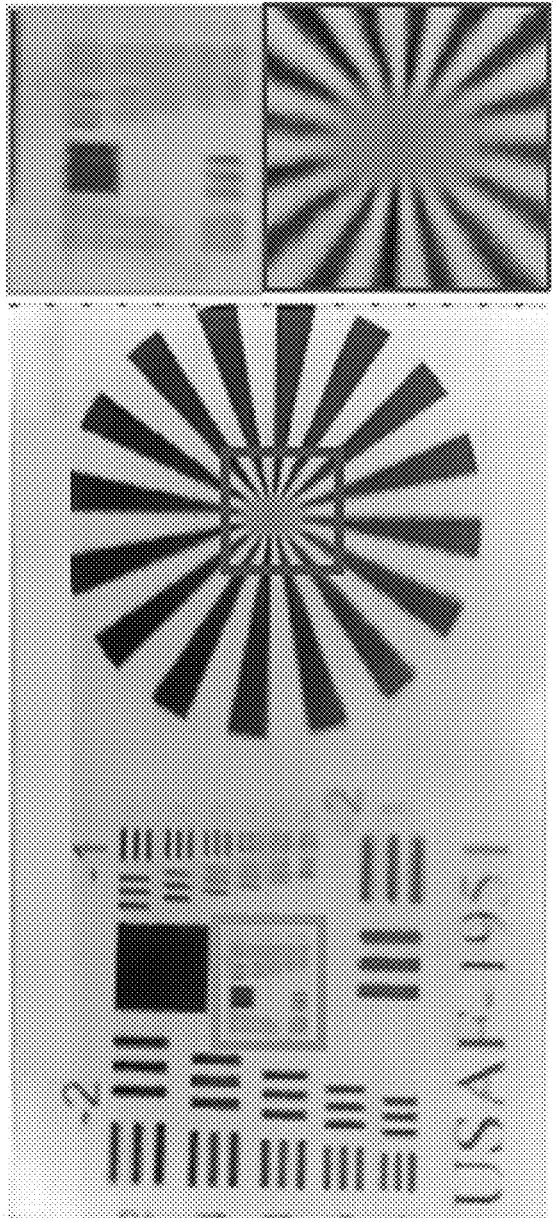
FIG. 6D depicts a high resolution CS-ToF reconstruction with a 0.25 compression ratio in accordance with an illustrative embodiment.
Figure 6E:
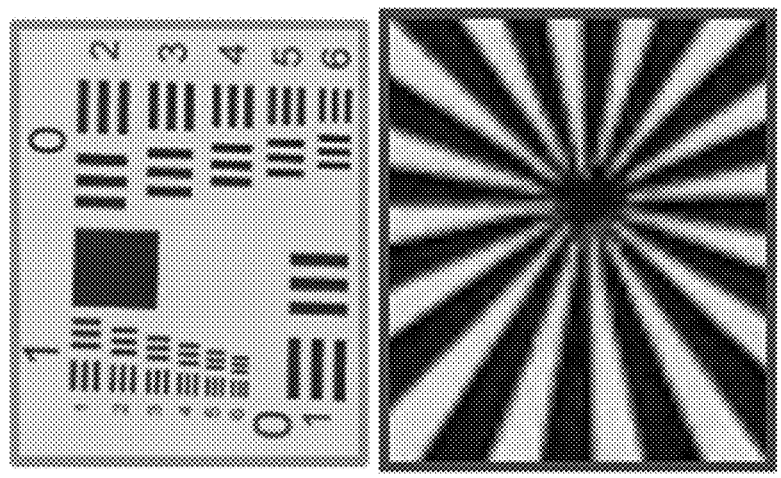
FIG. 6E depicts ground truth intensity of the insets, taken with a 12 megapixel (MP) camera, in accordance with an illustrative embodiment.
Figure 7B:
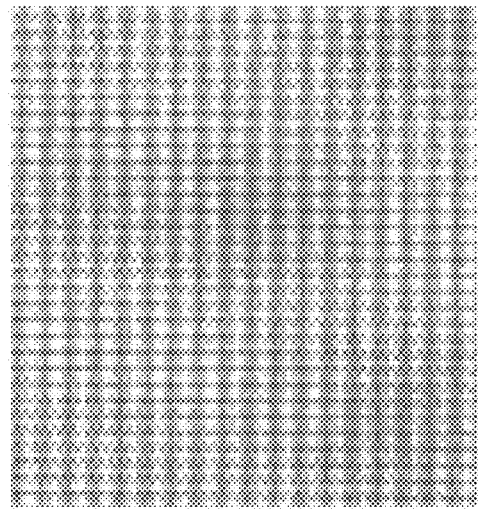
FIG. 7B depicts aliasing of the scene of FIG. 7A in accordance with an illustrative embodiment.
Figure 7D:
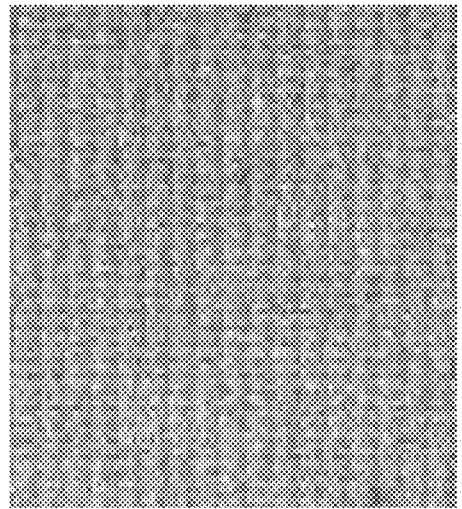
FIG. 7D depicts the use of low-pass filtering in accordance with an illustrative embodiment.
Figure 7A:
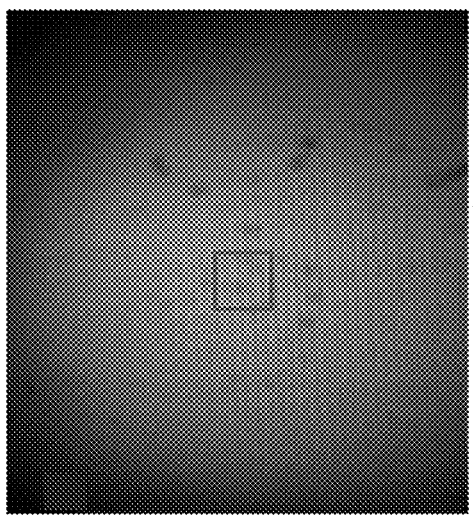
FIG. 7A depicts the scene on a digital micro-mirror device (DMD) with a ToF camera placed at the back focal plane of the relay plane in accordance with an illustrative embodiment.
Figure 7C:
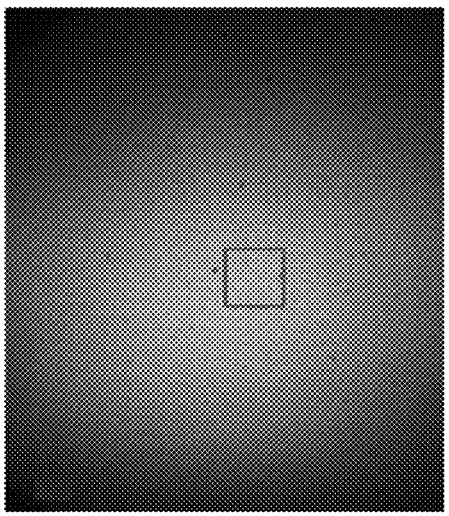
FIG. 7C depicts the scene on the DMD with a ToF camera slightly defocused in accordance with an illustrative embodiment.

For the USAF target, once can see much finer bars in the HR intensity images recovered by CS-ToF in FIGS. 6B-6D, compared to the original LR ToF measurement shown in FIG. 6A. Particularly, once can see the Element 1 in Group 0 inside the bounding box for all CS-ToF results at different compression ratios, which are completely indistinguishable in the original LR measurement. This implies that the resolution improvement is 2 to 3 times, which is consistent with the pixel-scanning result. For the Siemens Star, the original LR ToF measurement fails to characterize the high frequency component close to the center of the star (marked with a box). Conversely, the CS-ToF results at different compression ratios are able to resolve the high frequency component.

To evaluate the real-world performance of the CS-ToF prototype, an experiment on a natural scene was performed. As shown in FIG. 5D, the scene was constructed containing a toy tree, a metal star, two groups of toy bricks, a hollow resolution chart, and a white board, all of which are placed at different depths ranging from 0.5 to 1 meter (m) away from the sensor. Compressive sensing and reconstruction using 4.5, 0.6, and 0.25 compression ratios was performed.

The original LR ToF measurement and HR reconstructed phase images using CS-ToF were captured. Specifically, an LR ToF phase image was captured, an HR CS-ToF reconstruction phase image was captured using no compression, an HR CS-ToF reconstruction phase image using a 0.6 compression ratio was captured, and an HR CS-ToF reconstruction phase image using a 0.25 compression ratio was captured. Color bars were used to depict the depth information (in meters). Similar to resolution chart results, reconstruction with 0.25 compression ratio can generate a reasonable phase image. Compared to LR TOF phase image, more details in the recovered HR phase images are resolved. For instance, tree leaves can be clearly visualized in the recovered HR phase images with different compression ratios, but they are obscured in the LR ToF phase image. Furthermore, details of a single leaf can be clearly seen in the recovered HR phase images.

The experiment also focused on the far resolution chart shown in FIG. 5D. The scene includes two components at different depths: a portion of a resolution chart with original bars removed and the white board behind. The LR ToF phase image is unable to differentiate the depths in this region. However, the boundary between the two components are preserved and can be clearly seen from the recovered HR phase images.

Experiments were also conducted with intensity images using the proposed system. In the experiments, LR ToF intensity images were captured, HR CS-ToF reconstruction intensity image using no compression were captured, HR CS-ToF reconstruction intensity images using a 0.6 compression ratio were captured, and HR CS-ToF reconstruction intensity images using a 0.25 compression ratio were captured. Fine patterns on the toy tree and the metal star were visible in the HR images captured with the proposed system. It is noted that the screw on the metal star and the tip of the metal star are also visible. Also, branches of leaves can be seen in the recovered HR intensity images, but are hard to be distinguished in the LR ToF intensity images. Other examples can be seen from the center of the metal star: even the screw can be visualized in the recovered HR images. Additional tiny features such as the tip of the spike, the screw, etc. from the image of FIG. 5D can also be observed from the recovered HR intensity images.

It is noted that some artifacts were present in the recovered intensity images. The artifacts are due to imperfect alignments and calibration for the A matrix. This can be minimized by more careful calibration or advanced noise subtraction algorithms. In the experiments performed, background subtraction, non-local means filter and band-pass filter in the Fourier domain were used to minimize the artifacts in the recovered intensity images.

FIG. 7 depicts scenes projected on a DMD plane with white filed illumination in accordance with illustrative embodiments. Specifically, FIG. 7A depicts the scene on DMD with a ToF camera placed at the back focal plane of the relay plane in accordance with an illustrative embodiment. FIG. 7B depicts aliasing of the scene of FIG. 7A in accordance with an illustrative embodiment. FIG. 7C depicts the scene on DMD with a ToF camera slightly defocused in accordance with an illustrative embodiment. FIG. 7D depicts the use of low-pass filtering in accordance with an illustrative embodiment. In the proposed setup, multiple DMD pixels (e.g., m pixels) approximately project onto one pixel of the ToF sensor. Theoretically, the scene on the DMD should be of uniform brightness that is darker at the periphery due to vignetting, unlike the observation in FIG. 7A. This discrepancy is due to the low fill factor of the ToF, which causes missed DMD-ToF mapping information to be missed in the calibration of matrix A. This in turn causes aliasing, visible in FIG. 7B, which is an effect typical of all low fill factor sensors. This effect can be mitigated with conventional sensor anti-aliasing approaches, such as placing a diffuser on the surface of the sensor or slightly defocusing the projection onto the ToF camera. The effect of such low-pass filtering can be seen in FIGS. 7C-7D.

Compressive reconstruction of complex values can be a challenging process. The methods described herein can be used for different imaging models using CS reconstruction of complex inputs such as terahertz (THz) imaging, synthetic aperture radar, holography, etc. Regularizer and parameter choice can have significant effect the reconstruction quality, including CS reconstructions using the proposed architecture.

A key advantage of the CS-ToF system is the flexibility of trading-off among spatial resolution, temporal resolution, and image quality. The maximum spatial resolution (g) is limited by the physical resolution of the DMD or SLM, which is g=1.04 megapixel (MP) (1140×912) in the prototype. The ToF sensor in the prototype has a usable imaging area of s=186×200=0.037MP and can operate at f=150 feet per second (fps) maximum. In alternative embodiments, different values may be used. Therefore the maximum measurement bandwidth b=f·s=5.55 MP/s. The temporal resolution (t), and image quality is dependent on the number of measurements M used for reconstruction. At each measurement, the system takes s coded samples of the "ground truth" image on the DMD. For example, if image quality is not a concern, one can use M=1 measurement to perform the reconstruction, therefore a c=s·m/g=3.6% compression ratio is achieved, and the temporal resolution is t=f/m=150 fps. As demonstrated, high-quality reconstruction may involve a minimum of M=7 frames, resulting in a 0.037×7/1.04=0.25 compression ratio and 150/7=21.4 fps temporal resolution.

Figure 8B:
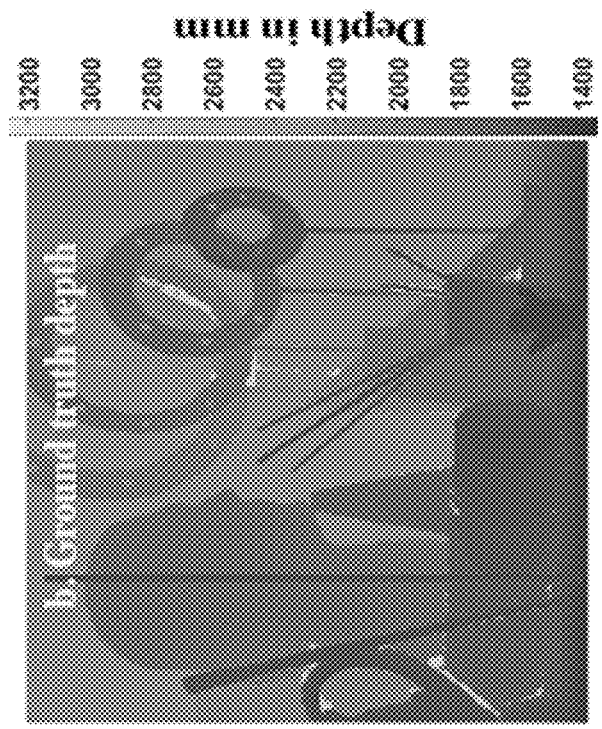
FIG. 8B depicts the ground truth depth for the 3D scene in accordance with an illustrative embodiment.
Figure 8A:
FIG. 8A depicts the 3D scene for the simulation experiments in accordance with an illustrative embodiment.
Figure 8D:
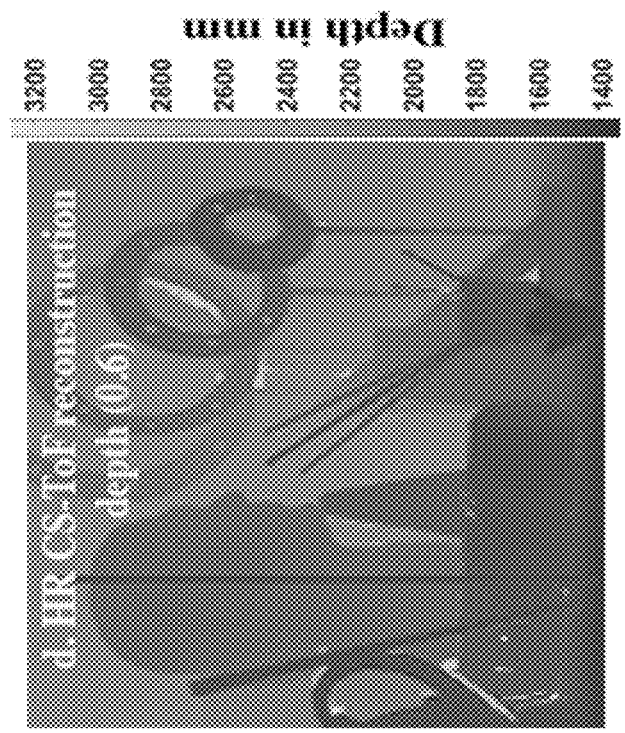
FIG. 8D shows the HR-CS-ToF depth images with 0.6 compression ratio in accordance with an illustrative embodiment.
Figure 8C:
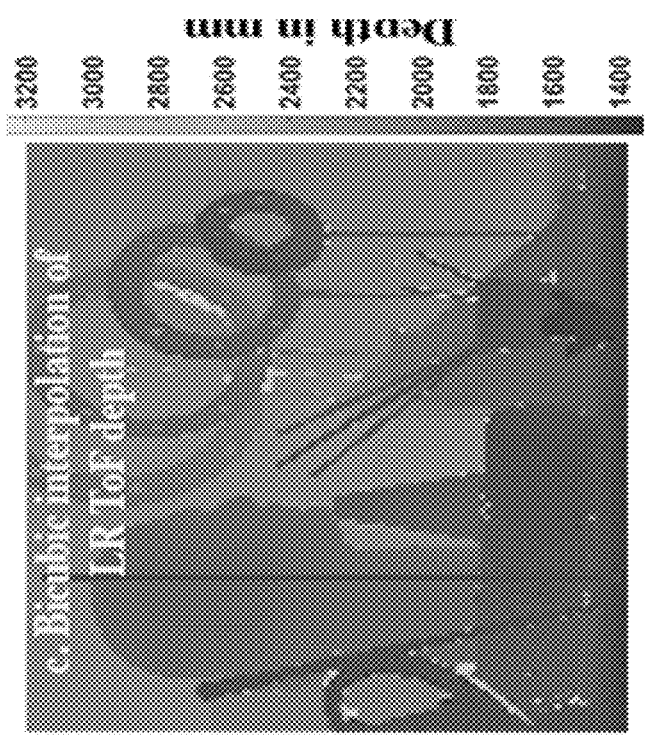
FIG. 8C depicts the bicubic interpolation of LR ToF measurement depth with 25 dB Gaussian noise added in the system in accordance with an illustrative embodiment.
Figure 8F:
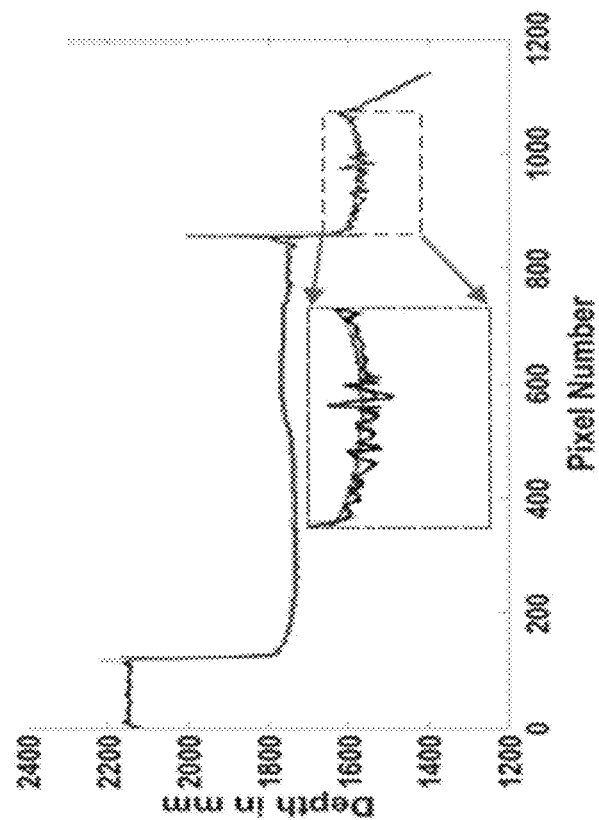
FIG. 8F shows the depth values along the lines in FIGS. 8B-8E with 30 dB signal-to-noise ratio (SNR) due to Gaussian noise added in the measurements in accordance with an illustrative embodiment.
Figure 8E:
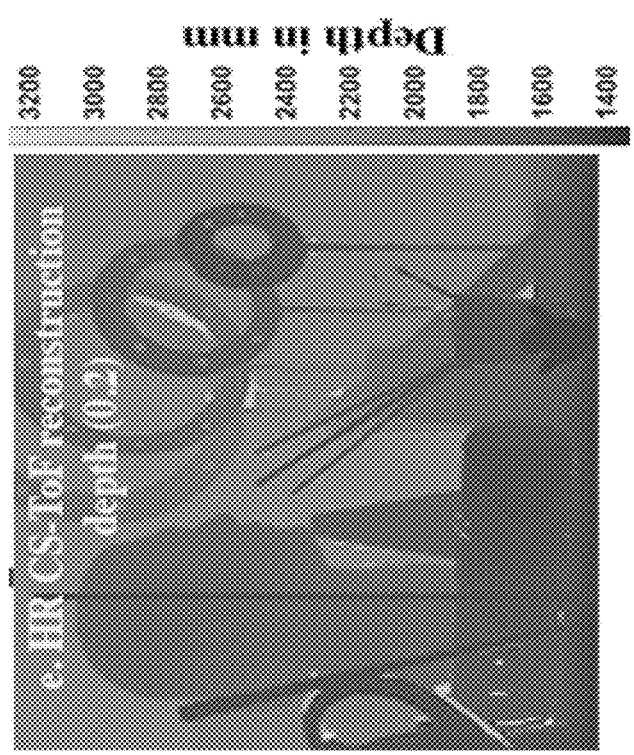
FIG. 8E shows the HR-CS-ToF depth images with 0.25 compression ratio in accordance with an illustrative embodiment.
Figure 8H:
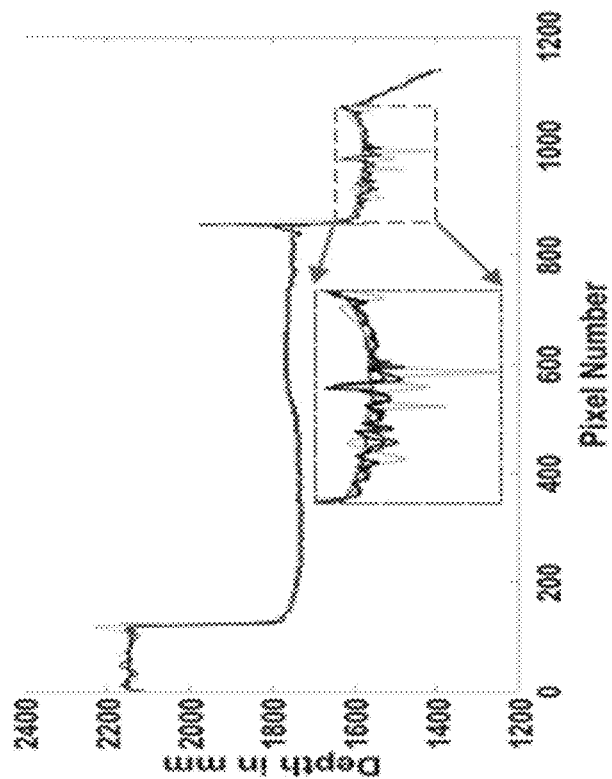
FIG. 8H shows the depth values on the same pixels of FIG. 8F with 20 dB SNR Gaussian noise added in accordance with an illustrative embodiment.
Figure 8G:
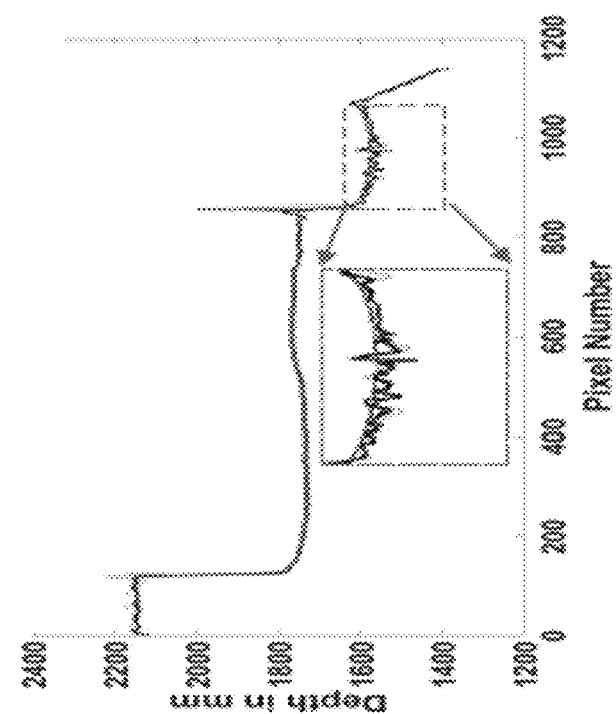
FIG. 8G shows the depth values on the same pixels of FIG. 8F with 25 dB SNR Gaussian noise added in accordance with an illustrative embodiment.

The phasor representation can be a linear model in the spatial domain for the ToF, but it is non-linear in the temporal domain which can potentially limit use for depth super resolution. A simulation experiment has been performed to quantify the depth accuracy of the CS-ToF framework. In the experiment, it was assumed that the DMD has 1140×912 pixels and the ToF sensor has 120×153 pixels. FIG. 8 depicts the quantification of depth accuracy for the CS-ToF system. Specifically, FIG. 8A depicts the 3D scene for the simulation experiments in accordance with an illustrative embodiment. FIG. 8B depicts the ground truth depth for the 3D scene in accordance with an illustrative embodiment. FIG. 8C depicts the bicubic interpolation of LR ToF measurement depth with 25 dB Gaussian noise added in the system in accordance with an illustrative embodiment. FIG. 8D shows the HR-CS-ToF depth images with 0.6 compression ratio in accordance with an illustrative embodiment. FIG. 8E shows the HR-CS-ToF depth images with 0.25 compression ratio in accordance with an illustrative embodiment. It is noted that a 25 dB Gaussian noise has also been added in the measurements of FIGS. 8D and 8E. FIG. 8F shows the depth values along the lines in FIGS. 8B-8E with 30 dB signal-to-noise ratio (SNR) due to Gaussian noise added in the measurements in accordance with an illustrative embodiment. FIG. 8G shows the depth values on the same pixels of FIG. 8F with 25 dB SNR Gaussian noise added in accordance with an illustrative embodiment. FIG. 8H shows the depth values on the same pixels of FIG. 8F with 20 dB SNR Gaussian noise added in accordance with an illustrative embodiment.

The 3D scene of FIG. 8A with ground truth depth (FIG. 8B) is chosen from the Middlebury Dataset. The intensity and depth images of the ground truth scene have the size of 1140×912 pixels. The translation matrix from the DMD plane to the ToF sensor plane in the CS-ToF framework is simulated in the same method described above with a custom-defined PSF. The responses on the ToF sensor are acquired using the forward model described above, and with Hadamard patterns, also described herein. The HR CS-ToF images were reconstructed with the same reconstruction algorithm described above using 0.6 and 0.2 compression ratios. Gaussian noises with signal-to-noise ratios (SNR) of 30 dB, 25 dB, and 20 dB were added in the ToF measurements.

To quantify the depth accuracy of the CS-ToF camera system, depth values from the same regions in the ground truth depth image (FIG. 8B) and the HR CS-ToF reconstruction depth image with 0.6 compression ratio (FIG. 8D) and 0.2 compression ratio (FIG. 18E), were selected and compared. To make a fair comparison, the bicubic interpolation of LR ToF measurement depth (FIG. 8C) was also generated by down-sampling the ground truth image to 120×153 pixels as the regular ToF response and then up-sampling to the same size with the ground truth. FIGS. 8C-8E are generated with 25 dB SNR Gaussian noise in the measurements. FIGS. 8F-8H show the depth values of pixels along the lines with different Gaussian noises added into the measurements. The root mean square error (RMSE) of HR CS-ToF reconstruction depth compared to the ground truth depth is calculated using the data shown in FIGS. 8D-8E. Additionally, the RMSE of LR ToF depth was quantified with bicubic interpolation compared to the ground truth depth. The results are summarized in FIG. 9. Specifically, FIG. 9 is a table depicting RMSE of LR ToF measurement depth with bicubic interpolation and HR CS-ToF reconstruction depth with respect to the ground truth depth in accordance with an illustrative embodiment. Although the depth accuracy of CS-ToF might be worse compared to the regular ToF imaging due to optical multiplexing in the CS-ToF, it has better depth accuracy compared to that of bicubic interpolation of the LR ToF measurement. The superscripts 1 and 2 in the table of FIG. 9 refer to reconstruction with a compression ratio of 0.6 and 0.2, respectively.

Figure 10:
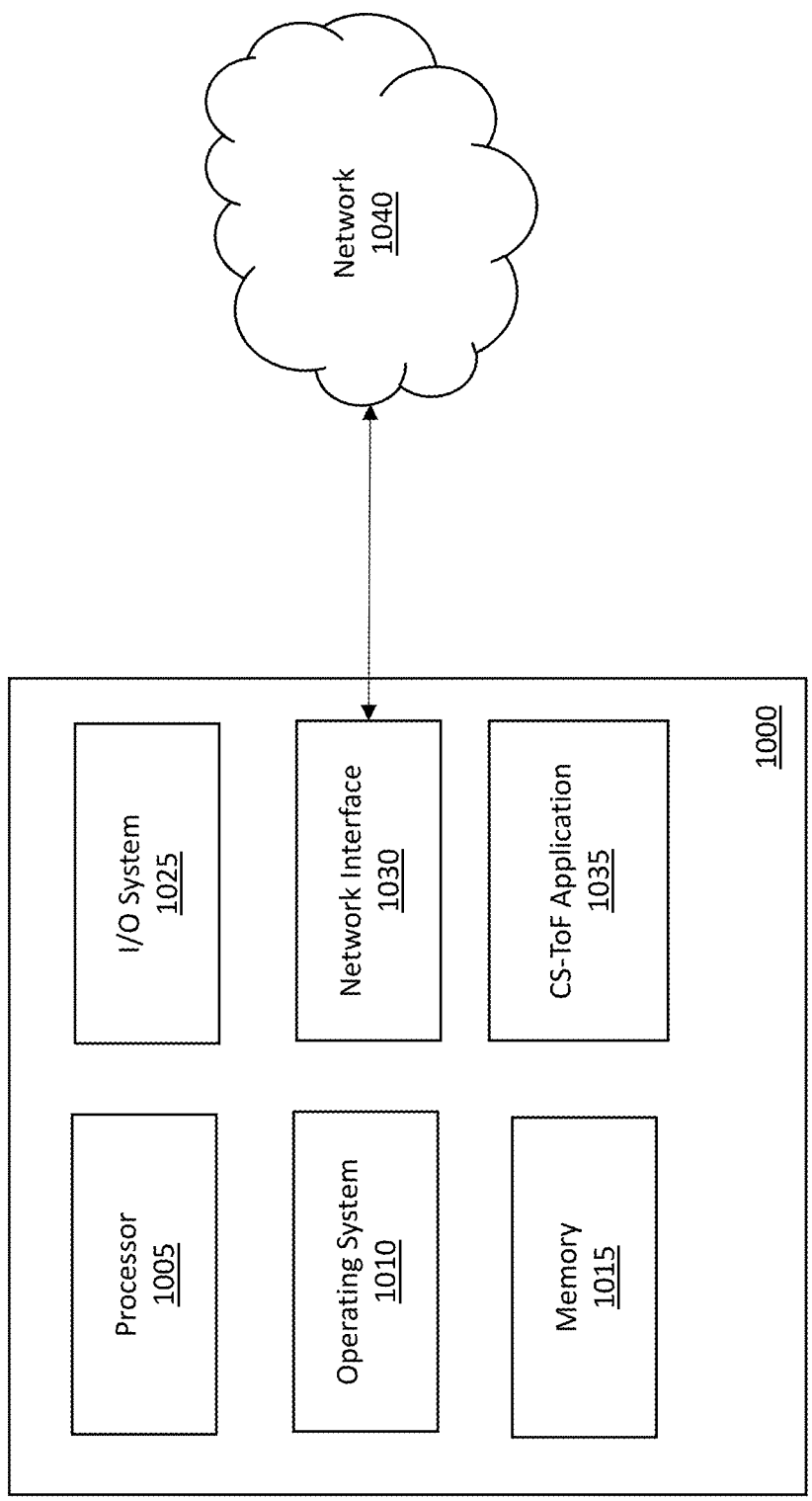
FIG. 10 is a block diagram of a computing system for a CS-ToF system in accordance with an illustrative embodiment.

FIG. 10 is a block diagram of a computing system 1000 for a CS-ToF system in accordance with an illustrative embodiment. The computing system 1000 includes a processor 1005, an operating system 1010, a memory 1015, an I/O system 1025, a network interface 1030, and a CS-ToF application 1035. In alternative embodiments, the computing system 1000 may include fewer, additional, and/or different components. The components of the computing system 1000 communicate with one another via one or more buses or any other interconnect system. In an illustrative embodiment, the computing system 1000 can be part of a laptop computer, desktop computer, display, etc.

The processor 1005 can be any type of computer processor known in the art, and can include a plurality of processors and/or a plurality of processing cores. The processor 1005 can include a controller, a microcontroller, an audio processor, a graphics processing unit, a hardware accelerator, a digital signal processor, etc. Additionally, the processor 1005 may be implemented as a complex instruction set computer processor, a reduced instruction set computer processor, an x86 instruction set computer processor, etc. The processor 1005 is used to run the operating system 1010, which can be any type of operating system.

The operating system 1010 is stored in the memory 1015, which is also used to store programs, network and communications data, peripheral component data, algorithms, the CS-ToF application 1035, and other operating instructions. The memory 1015 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O system 1025 is the framework which enables users and peripheral devices to interact with the computing system 1000. The I/O system 1025 can include a mouse, a keyboard, one or more displays, a speaker, a microphone, etc. that allow the user to interact with and control the computing system 1000. The I/O system 1025 also includes circuitry and a bus structure to interface with peripheral computing devices such as power sources, USB devices, peripheral component interconnect express (PCIe) devices, serial advanced technology attachment (SATA) devices, high definition multimedia interface (HDMI) devices, proprietary connection devices, etc. In an illustrative embodiment, the I/O system 1025 is configured to receive inputs and operating instructions from a user.

The network interface 1030 includes transceiver circuitry that allows the computing system 1000 to transmit and receive data to/from other devices such as remote computing systems, servers, websites, etc. The network interface 1030 enables communication through the network 1040, which can be in the form of one or more communication networks and devices. For example, the network 1040 can include a cable network, a fiber network, a cellular network, a wi-fi network, a landline telephone network, a microwave network, a satellite network, etc. and any devices/programs accessible through such networks. The network interface 1030 also includes circuitry to allow device-to-device communication such as Bluetooth® communication.

The CS-ToF application 1035 includes hardware and/or software, and is configured to perform any of the operations described herein. Software of the CS-ToF application 1035 can be stored in the memory 1015. As an example, the CS-ToF application 1035 can include computer-readable instructions to synchronize the components of a CS-ToF system, to calibrate a CS-ToF system, to process reflected light received by a ToF sensor, to implement user commands, to generate images, to control the light source, etc.

Thus, described herein is an architecture for high spatial resolution ToF imaging. A phasor representation was utilized to achieve a linear compressive sensing model, which is demonstrated using experimental hardware. It is believed that the proposed CS-ToF camera provides a simple and cost-effective solution for high resolution 3D imaging, which benefits many 3D imaging applications such as improving the accuracy for 3D detection and tracking.

As discussed above, it is to be understood that any of the operations/processes described herein may be performed at least in part by a computing system that includes a processor, memory, transceiver, user interface, etc. The described operations/processes can be implemented as computer-readable instructions stored on a computer-readable medium such as the computer system memory. Upon execution by the processor, the computer-readable instructions cause the computing system to perform the operations/processes described herein.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An image capturing system comprising:
a light source configured to emit light toward an object or scene that is to be imaged;
a time-of-flight image sensor configured to receive light signals based on reflected light from the object or scene; and
a processor operatively coupled to the light source and the time-of-flight image sensor, wherein the processor is configured to:
send a control signal to control the light source and a reference signal to the time-of-flight image sensor, wherein the time-of-flight image sensor correlates the received light signals with the reference signal;
generate phasor representations based at least in part on correlation signals captured in the reflected light from the object or scene; and
regularize an amplitude of the phasor representations based at least in part on a transform-domain sparsity;
perform compressive sensing of the received light signals; and
generate an image of the object or scene based at least in part on the compressive sensing of the received light signals.

2. The system of claim 1, wherein the processor is configured to amplitude modulate the light source and the time-of-flight image sensor.

3. The system of claim 1, further comprising a digital micro-mirror device that is configured to receive the reflected light and modulate the reflected light with a coded spatial pattern that is displayed on the digital micro-mirror device.

4. The system of claim 3, further comprising a relay lens configured to receive the light signals from the digital micro-mirror device and project the light signals onto the time-of-flight image sensor.

5. The system of claim 3, further comprising a mask on the digital micro-mirror device, wherein the mask forms the coded spatial pattern.

6. The system of claim 1, wherein processor generates the image of the object or scene based at least in part on a system matrix.

7. The system of claim 6, wherein the processor is configured to calibrate the system to estimate the system matrix.

8. The system of claim 6, wherein the system matrix represents pixel-to-pixel mapping between a digital micro-mirror device and the time-of-flight image sensor.

9. A method of capturing images with a time-of-flight camera system, the method comprising:
sending, by a processor, a control signal to control a light source and a reference signal to a time-of-flight image sensor that is operatively coupled to the processor;
capturing, by the time-of-flight image sensor, light signals based on reflected light from an object or scene;
generating phasor representations based at least in part on correlation signals captured in the light signals of the reflected light from the object or scene;
regularizing an amplitude of the phasor representations based at least in part on a transform-domain sparsity;
performing, by the processor, spatial multiplexing and compressive sensing on the captured light signals; and
generating, by the processor, an image of the object or scene based at least in part on the spatial multiplexing and the compressive sensing.

10. The method of claim 9, further comprising using the phasor representations to model a phase component and an amplitude component of the correlation signals.

11. The method of claim 9, further comprising performing amplitude modulation of a light source and the time-of-flight image sensor.

12. The method of claim 9, further comprising receiving, by a digital micro-mirror device, the reflected light, and modulating the reflected light with a coded spatial pattern that is displayed on the digital micro-mirror device.

13. The method of claim 9, further comprising calibrating, by the processor, the time-of-flight imaging system and generating a system matrix based at least in part on the calibration.

14. The method of claim 13, wherein generating the image of the object or scene is based at least in part on the system matrix, and wherein the system matrix represents pixel-to-pixel mapping between a digital micro-mirror device and the time-of-flight image sensor.

* * * * *